US012668057B2

(12) United States Patent
Sreenivasan et al.

(10) Patent No.: US 12,668,057 B2
(45) Date of Patent: Jun. 30, 2026

(54) CONTROLLING PRECISION SYSTEMS USING FREE TOPOLOGY WAVEFORMS

(71) Applicant: Board of Regents, The University of Texas System, Austin, TX (US)

(72) Inventors: Sidlgata V. Sreenivasan, Austin, TX (US); Brent Snyder, Austin, TX (US); Shrawan Singhal, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 17/913,562

(22) PCT Filed: Mar. 25, 2021

(86) PCT No.: PCT/US2021/024250
§ 371 (c)(1),
(2) Date: Sep. 22, 2022

(87) PCT Pub. No.: WO2021/195443
PCT Pub. Date: Sep. 30, 2021

(65) Prior Publication Data
US 2023/0095675 A1      Mar. 30, 2023

Related U.S. Application Data

(60) Provisional application No. 62/994,368, filed on Mar. 25, 2020.

(51) Int. Cl.
*B41J 2/045* (2006.01)
*G05B 13/02* (2006.01)
*B41J 29/393* (2006.01)

(52) U.S. Cl.
CPC ....... *B41J 2/04588* (2013.01); *B41J 2/04516* (2013.01); *B41J 2/04558* (2013.01); *G05B 13/021* (2013.01); *B41J 2029/3935* (2013.01)

(58) Field of Classification Search
CPC .................................................... B41J 2/04558
See application file for complete search history.

(56) References Cited

U.S. PATENT DOCUMENTS 10,336,062 B2    7/2019  Sreenivasan et al.
10,500,849 B1 *  12/2019  Ernst ................... B41J 2/04588
(Continued)

FOREIGN PATENT DOCUMENTS

JP        2006276079 A    10/2006
JP        2007160748 A     6/2007
(Continued)

OTHER PUBLICATIONS

International Search Report for International Application No. PCT/US2021/024250 dated Jun. 23, 2021, pp. 1-2.
Written Opinion of the International Searching Authority for International Application No. PCT/US2021/024250 dated Jun. 23, 2021, pp. 1-6.
(Continued)

*Primary Examiner* — Shelby L Fidler
(74) *Attorney, Agent, or Firm* — Robert A. Voigt, Jr.; Shackelford, McKinley & Norton, LLP

(57) ABSTRACT

A method, computer program product and system for precision inkjet printing. A control variable vector of actuation parameters associated with an inkjet waveform is determined. A printhead is then actuated to eject a grid of droplets from an inkjet onto a substrate based on the inkjet waveform. An image of the grid of droplets on the substrate is acquired. The acquired image is then processed to calculate a fitness function of the inkjet waveform that includes a function of sensed output variables associated with printing characteristics. The control variable vector is then adjusted by updating its topology based on the fitness function to obtain an optimized control variable vector associated with an optimized inkjet waveform.

19 Claims, 11 Drawing Sheets

FREE WAVEFORM 6

(56)          References Cited

U.S. PATENT DOCUMENTS

| | | | |
|---|---|---|---|
| 10,542,158 B1 | 1/2020 | Terada | |
| 2005/0088468 A1* | 4/2005 | Clark | B41J 2/04588 |
| | | | 347/11 |
| 2007/0057979 A1* | 3/2007 | Gardner | B41J 2/04588 |
| | | | 347/5 |
| 2007/0132804 A1 | 6/2007 | Chiwata | |
| 2008/0276215 A1 | 11/2008 | Higuchi et al. | |
| 2012/0136408 A1* | 5/2012 | Grill | A61N 1/3606 |
| | | | 607/45 |
| 2014/0035992 A1* | 2/2014 | Paulson | B41J 2/04588 |
| | | | 347/19 |
| 2014/0362135 A1 | 12/2014 | Terayama et al. | |
| 2016/0361041 A1* | 12/2016 | Barsimantov | A61B 8/065 |
| 2017/0259560 A1 | 9/2017 | Sreenivasan et al. | |

FOREIGN PATENT DOCUMENTS

| | | | |
|---|---|---|---|
| JP | 2008259168 A | 10/2008 | |
| JP | 2014527196 A | 10/2014 | |
| JP | 2017211959 A | 11/2017 | |

OTHER PUBLICATIONS

Extended European Search Report for European Patent Application No. 21 774 497.8 issued on Jul. 8, 2024, pp. 1-9.
Office Action for Japanese Patent Application No. 2022-558256 dated Feb. 14, 2025, pp. 1-14.
Notice of Preliminary Rejection for Korean Patent Application No. 10-2022-7035867 dated Sep. 30, 2025, pp. 1-5.

\* cited by examiner

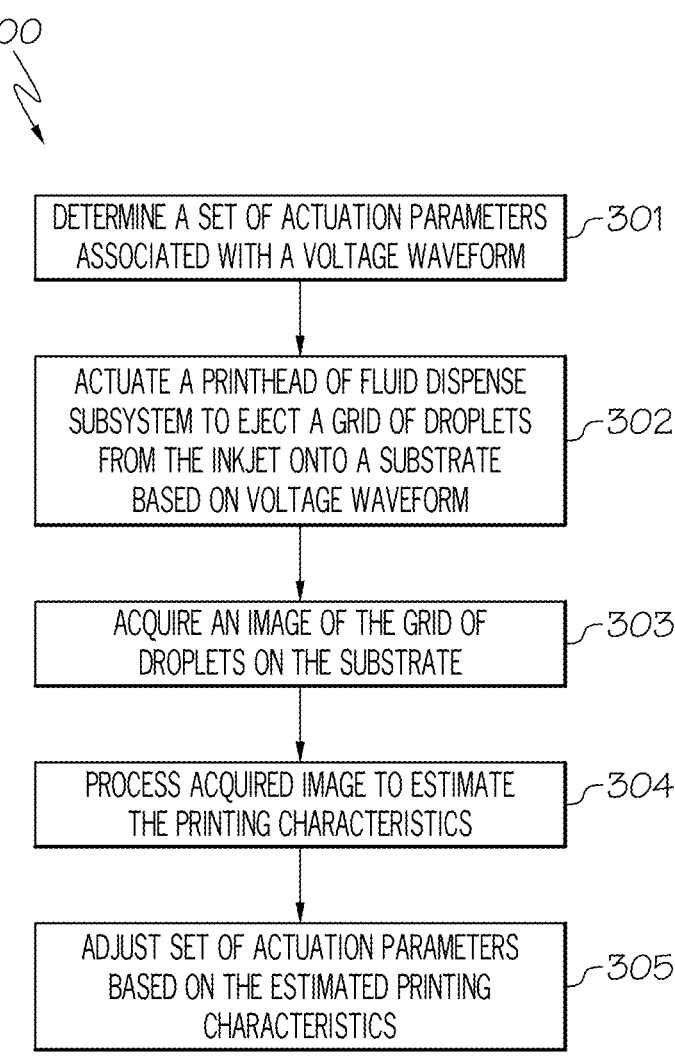

300

DETERMINE A SET OF ACTUATION PARAMETERS
ASSOCIATED WITH A VOLTAGE WAVEFORM — 301

ACTUATE A PRINTHEAD OF FLUID DISPENSE
SUBSYSTEM TO EJECT A GRID OF DROPLETS
FROM THE INKJET ONTO A SUBSTRATE
BASED ON VOLTAGE WAVEFORM — 302

ACQUIRE AN IMAGE OF THE GRID OF
DROPLETS ON THE SUBSTRATE — 303

PROCESS ACQUIRED IMAGE TO ESTIMATE
THE PRINTING CHARACTERISTICS — 304

ADJUST SET OF ACTUATION PARAMETERS
BASED ON THE ESTIMATED PRINTING
CHARACTERISTICS — 305

FIG. 3

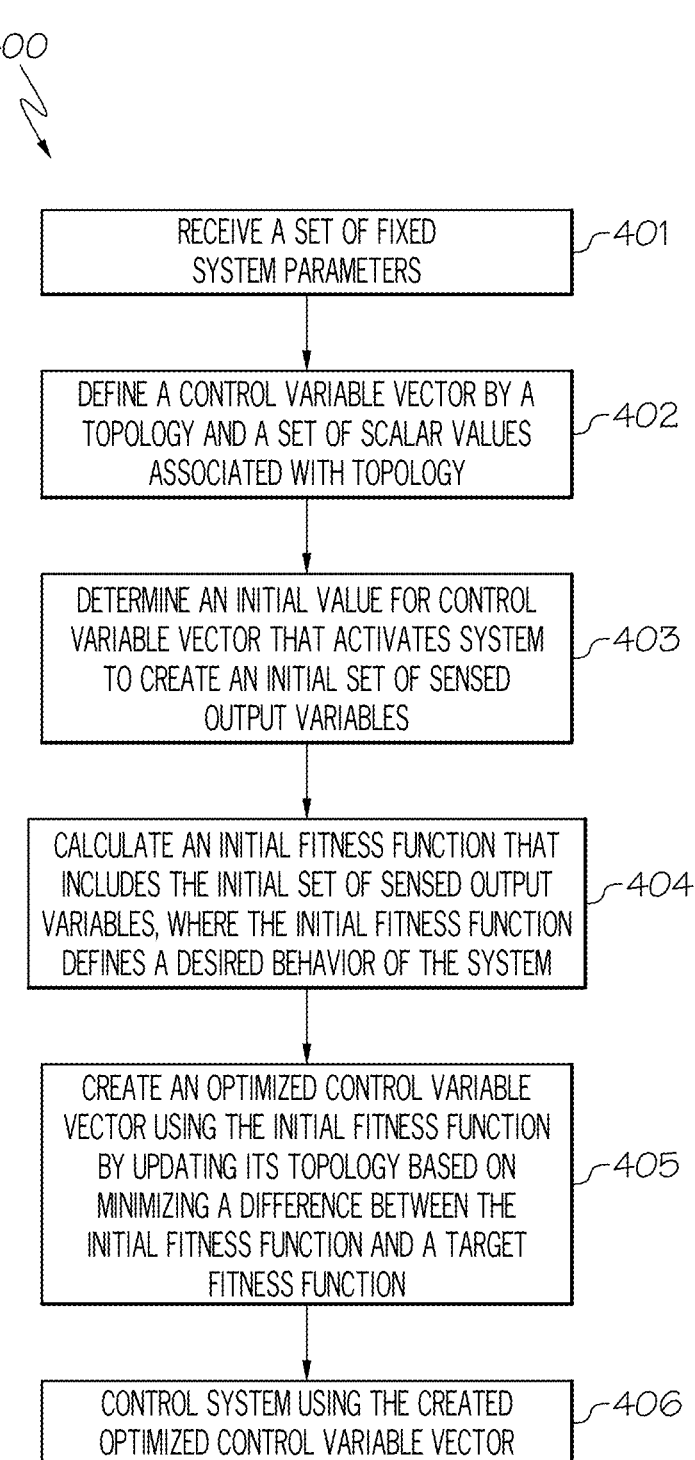

400

RECEIVE A SET OF FIXED
SYSTEM PARAMETERS ⟋401

DEFINE A CONTROL VARIABLE VECTOR BY A
TOPOLOGY AND A SET OF SCALAR VALUES
ASSOCIATED WITH TOPOLOGY ⟋402

DETERMINE AN INITIAL VALUE FOR CONTROL
VARIABLE VECTOR THAT ACTIVATES SYSTEM
TO CREATE AN INITIAL SET OF SENSED
OUTPUT VARIABLES ⟋403

CALCULATE AN INITIAL FITNESS FUNCTION THAT
INCLUDES THE INITIAL SET OF SENSED OUTPUT
VARIABLES, WHERE THE INITIAL FITNESS FUNCTION
DEFINES A DESIRED BEHAVIOR OF THE SYSTEM ⟋404

CREATE AN OPTIMIZED CONTROL VARIABLE
VECTOR USING THE INITIAL FITNESS FUNCTION
BY UPDATING ITS TOPOLOGY BASED ON
MINIMIZING A DIFFERENCE BETWEEN THE
INITIAL FITNESS FUNCTION AND A TARGET
FITNESS FUNCTION ⟋405

CONTROL SYSTEM USING THE CREATED
OPTIMIZED CONTROL VARIABLE VECTOR ⟋406

FIG. 4

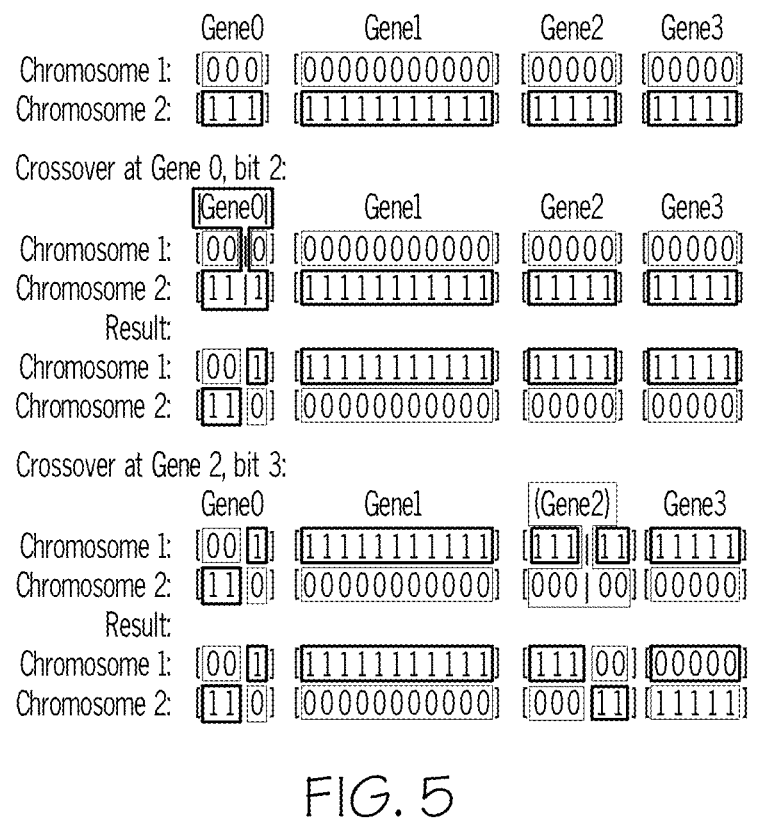

|  | Gene0 | Gene1 | Gene2 | Gene3 |
|---|---|---|---|---|
| Chromosome 1: | [0 0 0] | [0 0 0 0 0 0 0 0 0 0] | [0 0 0 0 0] | [0 0 0 0 0] |
| Chromosome 2: | [1 1 1] | [1 1 1 1 1 1 1 1 1 1] | [1 1 1 1 1] | [1 1 1 1 1] |

Crossover at Gene 0, bit 2:

|  | Gene0 | Gene1 | Gene2 | Gene3 |
|---|---|---|---|---|
| Chromosome 1: | [0 0 \| 0] | [0 0 0 0 0 0 0 0 0 0] | [0 0 0 0 0] | [0 0 0 0 0] |
| Chromosome 2: | [1 1 \| 1] | [1 1 1 1 1 1 1 1 1 1] | [1 1 1 1 1] | [1 1 1 1 1] |
| Result: |  |  |  |  |
| Chromosome 1: | [0 0 1] | [1 1 1 1 1 1 1 1 1 1] | [1 1 1 1 1] | [1 1 1 1 1] |
| Chromosome 2: | [1 1 0] | [0 0 0 0 0 0 0 0 0 0] | [0 0 0 0 0] | [0 0 0 0 0] |

Crossover at Gene 2, bit 3:

|  | Gene0 | Gene1 | (Gene2) | Gene3 |
|---|---|---|---|---|
| Chromosome 1: | [0 0 1] | [1 1 1 1 1 1 1 1 1 1] | [1 1 1 \| 1 1] | [1 1 1 1 1] |
| Chromosome 2: | [1 1 0] | [0 0 0 0 0 0 0 0 0 0] | [0 0 0 \| 0 0] | [0 0 0 0 0] |
| Result: |  |  |  |  |
| Chromosome 1: | [0 0 1] | [1 1 1 1 1 1 1 1 1 1] | [1 1 1 0 0] | [0 0 0 0 0] |
| Chromosome 2: | [1 1 0] | [0 0 0 0 0 0 0 0 0 0] | [0 0 0 1 1] | [1 1 1 1 1] |

FIG. 5

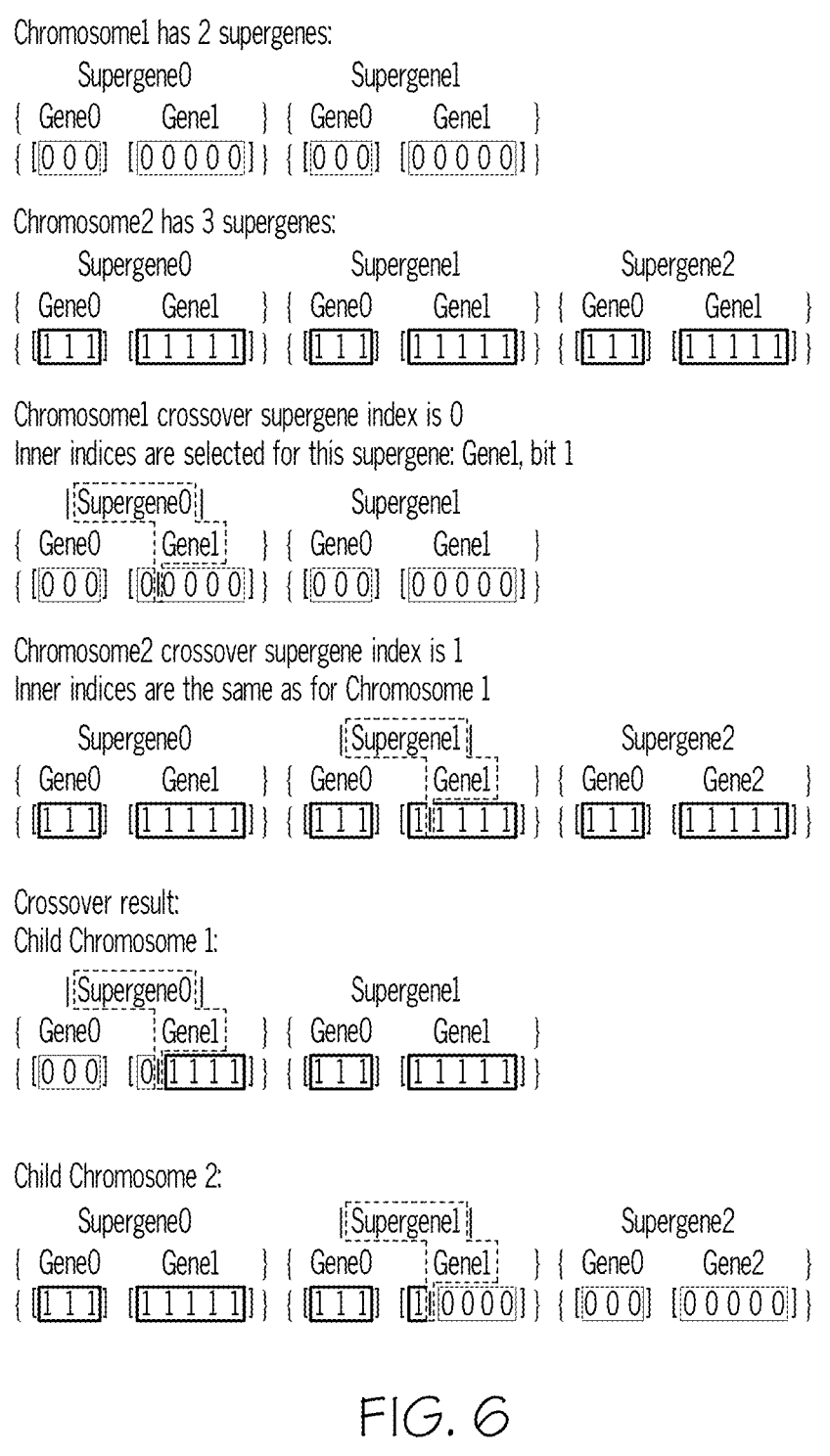

Chromosome1 has 2 supergenes:

Supergene0                    Supergene1
{ Gene0      Gene1    } { Gene0      Gene1    }
{ [0 0 0]  [0 0 0 0 0] } { [0 0 0]  [0 0 0 0 0] }

Chromosome2 has 3 supergenes:

Supergene0                    Supergene1                    Supergene2
{ Gene0      Gene1    } { Gene0      Gene1    } { Gene0      Gene1    }
{ [1 1 1]  [1 1 1 1 1] } { [1 1 1]  [1 1 1 1 1] } { [1 1 1]  [1 1 1 1 1] }

Chromosome1 crossover supergene index is 0
Inner indices are selected for this supergene: Gene1, bit 1

|Supergene0|                 Supergene1
{ Gene0      |Gene1|    } { Gene0      Gene1    }
{ [0 0 0]  [0|0 0 0 0] } { [0 0 0]  [0 0 0 0 0] }

Chromosome2 crossover supergene index is 1
Inner indices are the same as for Chromosome 1

Supergene0              |Supergene1|                 Supergene2
{ Gene0      Gene1    } { Gene0      |Gene1|    } { Gene0      Gene2    }
{ [1 1 1]  [1 1 1 1 1] } { [1 1 1]  [1|1 1 1 1] } { [1 1 1]  [1 1 1 1 1] }

Crossover result:
Child Chromosome 1:

|Supergene0|                 Supergene1
{ Gene0      |Gene1|    } { Gene0      Gene1    }
{ [0 0 0]  [0|1 1 1 1] } { [1 1 1]  [1 1 1 1 1] }

Child Chromosome 2:

Supergene0              |Supergene1|                 Supergene2
{ Gene0      Gene1    } { Gene0      |Gene1|    } { Gene0      Gene2    }
{ [1 1 1]  [1 1 1 1 1] } { [1 1 1]  [1|0 0 0 0] } { [0 0 0]  [0 0 0 0 0] }

FIG. 6

CONTROLLING PRECISION SYSTEMS USING FREE TOPOLOGY WAVEFORMS

GOVERNMENT INTERESTS

This invention was made with government support under Grant No. EEC1160494 awarded by the National Science Foundation. The U.S. government has certain rights in the invention.

TECHNICAL FIELD

The present invention relates generally to inkjet printing, and more particularly to precision inkjet printing using free topology waveforms.

BACKGROUND

Inkjet devices, such as printers, are configured to print an image onto a substrate, such as paper, plastic, or other material. Inkjet devices generally include a printhead that ejects ink droplets selectively from nozzles on the printhead onto the substrate, also referred to as "inkjetting." The ink droplets deposit on the substrate and a desired image is printed.

Inkjetting is a complex phenomenon involving several different physical processes interacting together. There are a variety of types of inkjet devices that use different mechanisms for inkjetting. For example, inkjet devices may include printheads using mechanisms, such as piezoelectric, thermal, electrohydrodynamic, and other suitable mechanisms. Piezoelectric inkjets use a piezoelectric element to acoustically excite ink in a channel behind the nozzle. The resulting changes in pressure at the nozzle cause droplets to eject. The piezoelectric element is operated by actuation waveforms, which are short electrical pulses generated for each ejection of a droplet.

For piezoelectric inkjets, the pressure at the orifice is based on a pressure waveform, which is typically a sequence of voltage ramps and plateaus on the order of tens of volts and approximately 2-50 microseconds ($\mu s$) in duration. Each time the voltage changes, the piezoelectric element deforms, which initiates acoustic pressure waves that travel to the nozzle and to the fluid reservoir. When the pressure waves reach the nozzle, the resulting changes in pressure control the dynamics of the fluid at the nozzle, which may result in the formation of a fluid column that ejects into one or more droplets from the nozzle.

When the ink stream breaks up into droplets, it may not produce droplets of a single size. The stream breaks up into a series of uniform large droplets that may also have smaller droplets referred to as "satellites." The shape of the pressure waveform determines the fluid dynamics at the nozzle, which determines multiple characteristics of the fluid droplets, such as the droplet volume and velocity and the satellite volume and size. Unfortunately, it is difficult to correlate the pressure waveform and resulting droplet formation and velocity.

The pressure waveform may vary based on the particular implementation. For example, a standard pressure waveform is the unipolar waveform that consists of two rising and falling impulses in sequence. The unipolar waveform is parameterized by the peak voltage and the dwell time, which is the time elapsed between the pulses. For a particular fluid and inkjet, an optimal dwell time for a unipolar waveform exists when the ejected droplet momentum is maximized at a given voltage. During typical operation, droplet volume and velocity tend to increase linearly with voltage at the optimal dwell time.

Other pressure waveforms may be utilized based on the goals of a particular implementation. For example, reducing droplet volume may require advanced waveforms to induce complex pressure gradients at the orifice. Additionally, fluids with challenging rheological properties may be prone to unstable jetting and may not be jettable with the standard unipolar waveform.

Multiple methods have been proposed and utilized to improve piezoelectric inkjets, which may include optimizing droplet volumes. Many of these methods provide for the inclusion of non-dimensional numbers and may also vary the pressure waveform, such as by using a bipolar waveform with modifications to dwell times. Numbers proposed and used in some methods include the Ohnesorge number, a related Z number, and/or other ratios. Such numbers relate to the jettability and/or printability of a particular fluid with a particular inkjet. Limits are often proposed for the numbers based on different fluids, such as wax suspensions or low viscosity inks, and the structure of inkjet nozzles, such as orifice radius, orifice length, or orifice diameter. The limits have taken into account fluid parameters, such as fluid viscosity, viscous dissipation, fluid surface tension, fluid density and/or the formation of satellites.

With respect to varied pressure waveforms, often a manual trial-and-error process is performed to select the optimal waveform. For fluids and performance requirements that fall into typical operating conditions for an inkjet device, a simple unipolar waveform may be easily optimized for stable jetting. However, in order to jet fluids with extreme properties while specifying droplet resolution, increasingly complex waveforms are required. As the complexity of the waveform increases, its versatility increases but the structure or topology of the problem explodes. This is because a greater number of parameters is needed to define the waveform structure or topology, which is beyond the scope of traditional manual tuning methods. While multiphysics simulations and models may predict droplet formation, these models are complex, non-linear, application-specific, excessively time consuming, and are non-invertible in nature. Furthermore, no analytic models exist that are useful for predicting droplet volumes from actuation waveforms. Additionally, any waveform tuning is specific to that particular combination of fluid and inkjet device.

The challenge of methods using non-dimensional numbers and/or varied waveforms is that the methods may be too conservative, e.g., artificially confine the limits of jetting performance. These methods may also depend on the fluid rheology and inkjet device geometry, without taking into account the complex coupling between the piezo-structural materials, actuation dynamics, inkjet geometry and fluid rheology. Manual tuning, as stated above, is only limited to simple waveforms with few parameters. Unfortunately, there is not currently a means for automatically optimizing pressure waveforms with a more complex structure or topology to control droplet resolution while maintaining drop placement accuracy or other figures of merit for any combination of material and inkjet device.

SUMMARY

In one embodiment of the present invention, a computer-implemented method for controlling a system comprises defining a control variable vector by a topology and a set of scalar values associated with the topology. The method further comprises determining an initial value for the control variable vector that activates the system to create an initial set of sensed output variables. The method additionally comprises calculating a fitness function comprising the initial set of sensed output variables, wherein the fitness function defines a desired behavior of the system. Furthermore, the method comprises creating an optimized control variable vector using the fitness function by updating its topology based on minimizing a difference between the fitness function and a target fitness function. Additionally, the method comprises controlling the system using the created optimized control variable vector.

Other forms of the embodiment of the computer-implemented method described above are in a system and in a computer program product.

In another embodiment of the present invention, a computer-implemented method for performing inkjet printing comprises determining a control variable vector of actuation parameters associated with an inkjet waveform. The method further comprises actuating a printhead to eject a grid of droplets from an inkjet onto a substrate based on the inkjet waveform. The method additionally comprises acquiring an image of the grid of droplets on the substrate. Furthermore, the method comprises processing the acquired image to calculate a fitness function of the inkjet waveform comprising a function of sensed output variables associated with printing characteristics, wherein the fitness function defines a desired behavior of an inkjet system. Additionally, the method comprises adjusting the control variable vector by updating its topology based on the fitness function to obtain an optimized control variable vector associated with an optimized inkjet waveform.

Other forms of the embodiment of the computer-implemented method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 3 is a flowchart of a method for precision inkjet printing with a multi-nozzle piezo inkjet head in accordance with an embodiment of the present invention;

FIG. 4 is a flowchart of a method for controlling a system in accordance with an embodiment of the present invention;

FIG. 5 is a diagram depicting the multi-level index crossover in a binary genetic algorithm in accordance with an embodiment of the present invention;

FIG. 6 is a diagram illustrating a multi-level crossover for chromosome with repeating supergenes in accordance with an embodiment of the present invention;

DETAILED DESCRIPTION

As stated in the Background section, the challenge of methods using non-dimensional numbers and/or varied waveforms is that the methods may be too conservative, e.g., artificially confine the limits of jetting performance. These methods may also depend on the fluid rheology and inkjet device geometry, without taking into account the complex coupling between the piezo-structural materials, actuation dynamics, inkjet geometry and fluid rheology. Manual tuning is only limited to simple waveforms with few parameters. Unfortunately, there is not currently a means for automatically optimizing complex pressure waveforms to control droplet resolution while maintaining placement accuracy for any combination of material and inkjet device.

The principles of the present invention provide a means for automatically optimizing complex pressure waveforms to control droplet resolution while maintaining placement accuracy and minimizing the presence of transient faults, satellite drops, missing drops and debris for any combination of material and inkjet device. In particular, embodiments of the present invention automatically optimize complex pressure waveforms to obtain the desired performance for any combination of material and inkjet device via the use of an inkjet test bed for a multi-nozzle piezojet that allows in-situ imaging and automated tuning of waveforms. Furthermore, embodiments of the present invention involve a novel tuning scheme based on free topology optimization.

In one embodiment, a multi-nozzle printhead testbed incorporates drop-on-substrate computer vision imaging. The inkjet printhead dispenses on a substrate, carried by a precision XY motion stage. The stage then positions the dispensed drops under a microscope, and performance is measured using automated computer-vision based inspection techniques.

Figure 1:
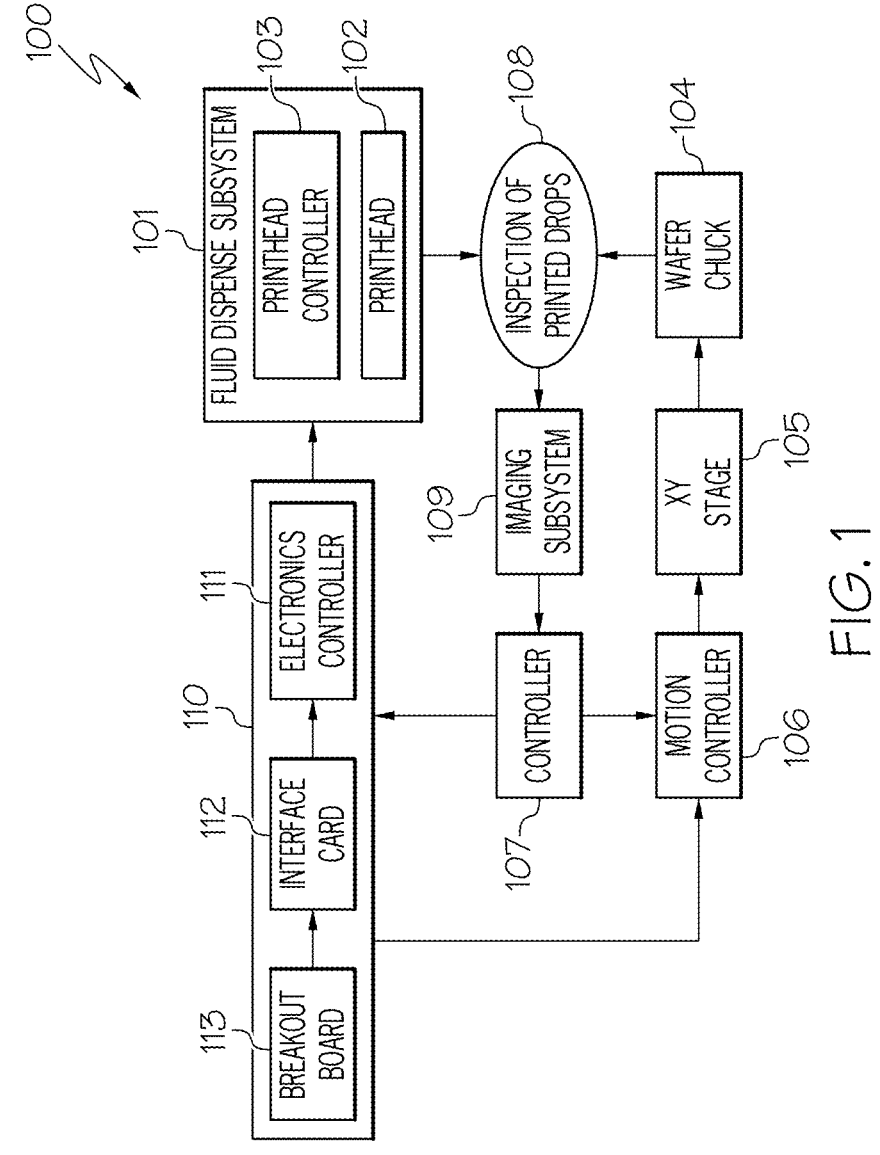
FIG. 1 illustrates an embodiment of the testbed in accordance with an embodiment of the present invention.

FIG. 1 illustrates an embodiment of the testbed 100 in accordance with an embodiment of the present invention. Referring to FIG. 1, testbed 100 includes a fluid dispense subsystem 101 (e.g., Samba® G3L printhead) that includes a printhead 102 along with a printhead controller 103 configured to control the dispensing of printed drops by printhead 102 of fluid dispense subsystem 101. In one embodiment, fluid dispense subsystem 101 is configured to dispense printed drops by a printhead 102 on a wafer held by a wafer chuck 104 (e.g., a 200 mm diameter wafer chuck) placed on an XY stage 105 (e.g., Newport™ XML350 stage) that is moved by a motion controller 106 (e.g., Newport™ XPS C8 motion controller) controlled by a controller 107 (also referred to herein as the "computer vision system"). The printed drops are inspected (see element 108) by imaging subsystem 109 (e.g., Mitutoyo® objective and FLIR camera). In one embodiment, testbed 100 may further include an automation software system 110 controlled by controller 107. A description of the hardware configuration of controller 107 is provided further below in connection with FIG. 2.

In one embodiment, automation software subsystem 110 includes an electronics controller 111 (e.g., Samba® drive electronics controller), an interface card 112 (e.g., Samba® peripheral component interconnect (PCI) express interface card), and a breakout board 113 (e.g., Samba® PCI express breakout board).

In one embodiment, testbed 100 may include other subsystems not shown in FIG. 1, such as a waste filtration and imaging system bridges.

In one embodiment, imaging subsystem 109 consists of an additional in-flight drop watching system to allow precision assembly of the test bed. Such an in-flight drop watching system is described in U.S. Pat. No. 10,336,062, which is incorporated by referenced herein in its entirety.

In one embodiment, a software application is written in a programming language (e.g., Python) to provide high-level automation functionality as well as low-level instrument drivers for motion control, jetting, and image capture, image processing and analysis, waveform parsing and generation capabilities, and a graphical user interface (GUI) to enable the operator to perform various subprocedures for testing and debugging. In one embodiment, automation software subsystem 110 is configured to create software and systems to replace repeatable processes and reduce manual intervention, including providing high-level automation functionality as well as low-level instrument drivers for motion control, jetting, and image capture, image processing and analysis, waveform parsing and generation capabilities, and a graphical user interface (GUI) to enable the operator to perform various subprocedures for testing and debugging. In one embodiment, automation software subsystem 100 is configured to provide a waveform to actuate printhead 102 using a free topology optimization as discussed herein.

In one embodiment, such a software application resides in the application of controller 107 as discussed further below in connection with FIG. 2.

Figure 2:
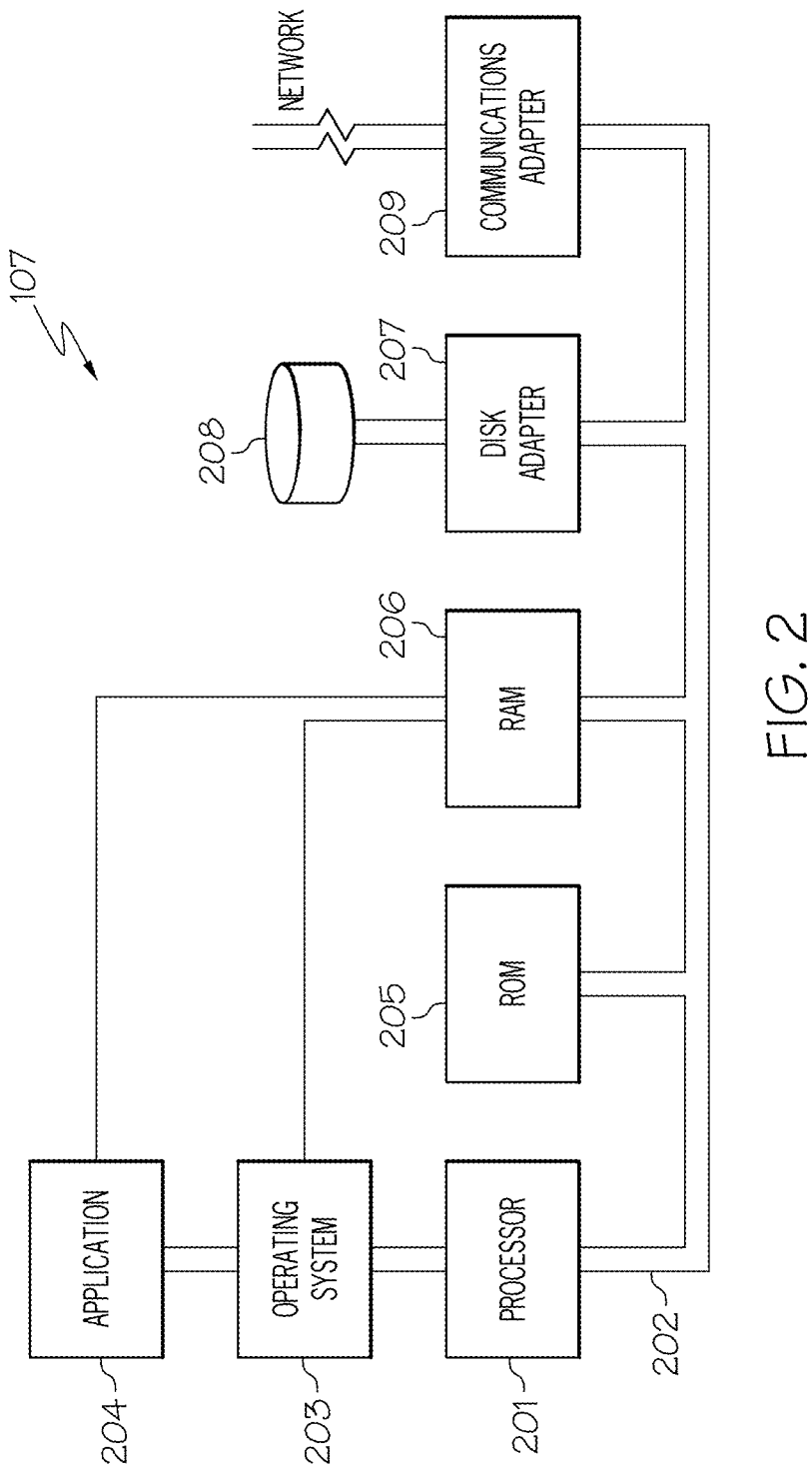
FIG. 2 illustrates an embodiment of the present disclosure of the hardware configuration of the controller which is representative of a hardware environment for practicing the present invention.

Referring now to FIG. 2, FIG. 2 illustrates an embodiment of the present invention of the hardware configuration of controller 107 (FIG. 1) which is representative of a hardware environment for practicing the present invention.

Controller 107 has a processor 201 connected to various other components by system bus 202. An operating system 203 runs on processor 201 and provides control and coordinates the functions of the various components of FIG. 2. An application 204 in accordance with the principles of the present disclosure runs in conjunction with operating system 203 and provides calls to operating system 203 where the calls implement the various functions or services to be performed by application 204. Application 204 may include, for example, a program to provide high-level automation functionality as well as low-level instrument drivers for motion control, jetting, and image capture, image processing and analysis, waveform parsing and generation capabilities, and a graphical user interface (GUI) to enable the operator to perform various subprocedures for testing and debugging.

Referring again to FIG. 2, read-only memory ("ROM") 205 is connected to system bus 202 and includes a basic input/output system ("BIOS") that controls certain basic functions of controller 107. Random access memory ("RAM") 206 and disk adapter 207 are also connected to system bus 202. It should be noted that software components including operating system 203 and application 204 may be loaded into RAM 206, which may be controller's 107 main memory for execution. Disk adapter 207 may be an integrated drive electronics ("IDE") adapter that communicates with a disk unit 208, e.g., disk drive. It is noted that the program for providing high-level automation functionality as well as low-level instrument drivers for motion control, jetting, and image capture, image processing and analysis, waveform parsing and generation capabilities, and a graphical user interface (GUI) to enable the operator to perform various subprocedures for testing and debugging, as discussed herein, may reside in disk unit 208 or in application 204.

Controller 107 may further include a communications adapter 209 connected to bus 202. Communications adapter 209 interconnects bus 202 with an outside network to communicate with other devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 3, FIG. 3 is a flowchart of a method 300 for precision inkjet printing with a multi-nozzle piezo inkjet head in accordance with an embodiment of the present invention.

Referring to FIG. 3, in conjunction with FIGS. 1-2, in step 301, a control variable vector of actuation parameters associated with a voltage waveform (e.g., inkjet waveform) is determined by controller 107.

In step 302, based on the voltage waveform, printhead 102 of fluid dispense subsystem 101 is actuated by printhead controller 103 to eject a grid of droplets from the inkjet onto a substrate held by wafer chuck 104. In one embodiment, printhead 102 is configured to dispense multiple fluids, where one of the fluids dispensed has a different rheological property than another of the dispensed fluids.

In step 303, an image of the grid of droplets on the substrate is acquired, such as via imaging subsystem 109.

In step 304, the acquired image is processed by controller 107 to calculate the fitness function of the waveform comprising a function of estimated sensed output variables associated with printing characteristics (e.g., drop volume uniformity, mean drop volume, drop placement accuracy, presence of transient faults, number of satellite drops, number of missing drops, presence of debris, etc.). In one embodiment, the fitness function defines a desired behavior of an inkjet system.

In step 305, based on the calculated fitness, the control variable vector is adjusted by controller 107 by updating its topology to obtain an optimized control variable vector associated with an optimized waveform (e.g., optimized inkjet waveform). In connection with adjusting the control variable vector, an error between the fitness function and a target fitness function is calculated. For example, in one embodiment, a new set of actuation parameters is calculated and compared against the target fitness, with an aim of minimizing a difference between the calculated fitness and the target fitness. In connection with minimizing a difference between the calculated fitness and the target fitness, the set of actuation parameters can be adjusted multiple times.

Method 300 will be discussed in greater detail further below.

Referring now to FIG. 4, FIG. 4 is a flowchart of a method 400 for controlling a system (or a model of the system) in accordance with an embodiment of the present invention.

Referring to FIG. 4, in conjunction with FIGS. 1-2, in step 401, a set of fixed system parameters are received, such as by controller 107. In one embodiment, step 401 is unnecessary if method 400 is used to directly control the system and not a model of the system. The above fixed system parameters represent aspects or characteristics of the system that are invariant or do not change during the course of controlling the system. In one embodiment, the system is a precision inkjet with the set of fixed system parameters including one or more of the following: a number of nozzles, a nozzle pitch, a nominal nozzle diameter and a fluid to be jetted. In one embodiment, such a set of fixed system parameters are inputted to controller 107 by a user of controller 107, such as via input means to controller 107.

In step 402, controller 107 defines a control variable vector by a topology and a set of scalar values associated with the topology. "Control variables," as used herein, refer to the inputs to the system that are optimized and that allow the system to be controlled such that a desired performance of the system is achieved. A "control variable vector," as used herein, refers to a set of one or more control variables. In one embodiment, the topology of the control variable vector is given by the structure of the vector and provides an estimate of the complexity of the same. In one embodiment, the topology is defined as the number of control variables present in the control variable vector. In general, a higher topology control variable vector has higher complexity and is more difficult to optimize using manual techniques, thereby requiring automated optimization techniques. In one embodiment, the control variable vector defines an inkjet waveform by defining parameters, such as voltage ramps and dwells. The number of such parameters is used to define the topology of the inkjet waveform.

In step 403, controller 107 determines an initial control variable vector, such that when this initial control variable vector is passed to controller 107, the system or its model is activated to create an initial set of sensed output variables. The "sensed output variables," as used herein, refer to quantities that are estimated with the help of data from the sensors associated with the system. In one embodiment, controller 107 is used to process the data from the sensors to estimate the sensed output variables. In one embodiment, activation of the system involves jetting a grid of drops on a substrate. In one embodiment, the initial value for the control variable vector activates an inkjet system to create the initial set of sensed output variables. In one embodiment, the initial set of sensed output variables includes one or more of the following: a volume, a drop placement accuracy, a velocity, satellites of inkjetted drops, missing drops and transient faults in inkjetted drops. In one embodiment, the sensed output variables are estimated using data from the imaging subsystem.

In step 404, controller 107 creates an initial fitness function, where the "fitness function," as used herein, represents one or more figures of merit used to define the performance of the system as one or more functions of the initial set of sensed output variables. In one embodiment, the initial fitness function defines the desired behavior of an inkjet system, where the desired behavior includes one or more of the following: matching a target drop volume resolution, maximizing drop placement accuracy, minimizing transient faults, minimizing satellite drops, minimizing missing drops, and minimizing debris.

In step 405, controller 107 runs an automated optimization scheme to create an optimized control variable vector using the initial fitness function by updating and adjusting the topology of the control variable vector such that a difference between a value of the fitness function of the optimized control variable vector and the value of a target fitness function is minimized. In one embodiment, the optimized control variable vector is created in response to an algorithm being executed until the initial fitness function reaches a maximum value. In one embodiment, the optimized control variable vector includes an optimum topology and a set of optimal parameters for the optimum topology. In one embodiment, the topology of the optimized control variable vector is more complex than the topology of the initial control variable vector.

In step 406, controller 107 controls the system using the created optimized control variable vector.

Method 400 will be discussed in greater detail below.

Referring to FIGS. 1-4, application 204 of controller 107 may include, for example, a program for controlling a system, such an inkjet system as discussed above in connection with FIG. 4. In one embodiment, application 204 may include, for example, a program to provide high-level automation functionality as well as low-level instrument drivers for motion control, jetting, and image capture, image processing and analysis, waveform parsing and generation capabilities, and a graphical user interface (GUI) to enable the operator to perform various subprocedures for testing and debugging. In one embodiment, waveforms for each experiment are generated using genetic algorithms, and the computer vision system (controller 107) measures drop placement accuracy and drop sizes via imaging subsystem 109. XY stage 105 is controlled by sending commands over a socket interface to controller 107.

In one embodiment, an example of the fluid dispense subsystem 101 consists of the Fujifilm® Dimatix Samba® piezo-jet printhead, Samba® Development Kit controller/drive electronics and PCIe interface card, and the Samba® ink delivery system. That is, in one embodiment, a portion of automation software system 110 is embedded within fluid dispense subsystem 101. In one embodiment, fluid dispense subsystem 101 utilizes the Samba® G3L printhead, which has an array of 2,048 nozzles set in 16 rows over a span of 43.349 mm with a nozzle pitch of 21.1167 μm. A single printhead can jet 1,200 dots per inch drop pattern or image with a 40.64 mm height using the center 1,920 nozzles. In one embodiment, printhead controller 103 (e.g., Samba® controller) supports up to 4 printheads, which can be mounted side by side to print larger images.

In one embodiment, imaging subsystem 109 of testbed 100 incorporates a telecentric microscope equipped with inline illumination and a 3.2-megapixel camera (e.g., FLTR Grasshopper®3 GS3-U3-32S4M-C, which has a Sony® IMX252 monochrome image sensor with 2048×1536 pixels that are each 3.45 μm×3.45 μm) for top-down inspection of the dispensed drops on a silicon substrate. An example of a microscope is a Moritex MML3-HR110DVI-43F telecentric microscope, which supports up to 35 mm sensors with <0.05% distortion. In one embodiment, the illumination is provided by a CCS HLV2-22SW-3 W spotlight LED and a PJ-1505-2CA current source. Images are captured by initiating a software trigger using Python drivers and downloading the image via the camera's USB 3.0 connection to controller 107. The detection of sessile drops on a flat substrate can be done using the following steps: background subtraction, image binarization and segmentation, and contour analysis. This procedure also allows the detection of satellite mist drops that are critical for evaluating the performance of an actuation waveform.

In one embodiment, multiple images of a planar substrate are stitched together with the help of additional calibration steps that combine the orientations of the X and Y with the misalignment of the camera. In one embodiment, such images are stitched together to generate an image of the grid of droplets. In one embodiment, calibration targets can be used to analyze image distortion.

Jetting performance can be summarized by drop placement and drop volume statistics. In one embodiment, to test the performance of the waveforms generated by the genetic algorithm, a drop pattern is printed on the substrate after loading each waveform to the printhead. The camera captures an image before and after each dispense, and the images are processed to determine the centroid and area of the dispensed drops. The drop locations are then compared with an ideal drop pattern. In one embodiment, the drop placement performance is analyzed by the mean squared difference between the aligned ideal grid and the drop locations.

In one embodiment, a variety of fault modes are detected when viewing on-substrate inkjet-printed drops and classified based on their root cause. These faults can result from waveform instability, fluid accumulation on the printhead nozzle faceplate, or contamination of the substrate.

The following discusses advanced evolutionary algorithms applied to a multi-nozzle inkjet system to perform parametric and topological optimization of piezo-jet actuation waveforms. A discussion regarding precision inkjet printing, as discussed in U.S. Pat. No. 10,336,062, is incorporated by reference herein in its entirety.

Embodiments of the present invention include a control system that has one or more fixed system parameters, one or more control variables and one or more sensed output variables. In one embodiment, a controller can be created for this system with a variable number of control variables and thus, a variable topology or dimensionality. In the absence of automated tuning or to keep the controller simple, in one embodiment, the topology of the control system is kept fixed, where a fixed set of control variables are used. However, such an approach may not extract the highest performance from the control system. As a result, in one embodiment, an automated algorithm, referred to herein as "free topology optimization," which can handle control systems with variable topology, and which can simultaneously optimize, both the topology and the values of the control variables associated with that topology, is utilized to extract the desired performance from a control system, such as a precision inkjet printhead. For example, in one embodiment, an optimization scheme, such as evolutionary algorithms, or specifically genetic algorithms, can be chosen to extract the desired performance from a control system. In one embodiment, the sensed output variables are used to define one or more fitness functions or figures of merit for the control system, where this fitness function is defined as a difference between a target value of a function of the sensed output variables and an achieved value of a function of the sensed output variables.

In one embodiment, the principles of the present invention involve the following aspects: (i) multi-nozzle inkjet systems are investigated which necessitated top-down image processing of drops dispensed on substrates, such as silicon wafers; and (ii) "free-topology" waveforms are explored—beyond the fixed-topology (or fixed number of parameters)

waveforms—which allowed complex waveforms parameterized by more than twenty independent variables.

For fixed topology optimization, an optimization algorithm incorporating computer vision measurements of in-flight drops can perform a parametric optimization of a set of waveform topologies, such as unipolar, bipolar and tripolar waveforms with a fixed number of parameters (4, 7 and 10, respectively). Even with fixed topology optimization, results have demonstrated that the modulation of the volume and velocity of jetted drops as well as the stability of jetting of high Z-number materials depends on the piezo-jet actuation waveform.

In one embodiment, the principles of the present invention develop a scheme for generating waveforms with high order topologies. High order topologies, i.e., waveforms with large numbers of parameters, which are difficult to tune manually, have shown the ability to achieve higher performance metrics versus low order topologies. Additionally, in one embodiment, this scheme has been applied to measurement of in-flight drops which can demonstrate steady-state performance for a single nozzle printhead. In another embodiment, this scheme has been demonstrated on a multi-nozzle inkjet printhead using drop-on-substrate imaging (previously described), which also measures transient performance, stability and reliability.

In one embodiment, piezo-jet controllers actuate each nozzle by applying a shaped voltage pulse each time a drop is ejected from the printhead. The typical constraints on the waveform shape are the controller voltage (voltage of printhead controller 103 in fluid dispense subsystem 101) and timestep resolution, amplifier slew rate, amplifier maximum and minimum output voltages, and a wavelet-like DC voltage boundary condition, where the waveforms start and end at the same voltage (typically 0V).

The inputs to controller 103 are typically either defined by a set of time-voltage pairs or a set of voltage ramps defined by time, slew rate, and saturation voltage triplets.

For example, the Fujifilm® Samba® printhead waveform is represented by voltage ramp triplets, with a waveform voltage constrained to 256 steps between 0V and 36V with a timestep of 64 ns and a maximum slew rate of 25 voltage steps per timestep, or 55.147 V/µs. This offers a substantially large opportunity space for optimal waveforms, and to derive a systematic approach for exploring increasingly complicated waveforms to realize the full potential of the jetting hardware for a given material.

In one embodiment, evolutionary algorithms for optimization of higher order topology waveforms use variable length chromosomes. A genetic algorithm supporting variable length chromosomes requires a specialized crossover and gene structure to allow crossover between chromosomes of differing lengths. In an ordinary binary string chromosome, the bits from various genes would be concatenated into a single string before crossover. Recombination would be restricted to the exchange of equal-length sections sliced from the same indices of each chromosome string. For chromosomes of differing lengths, the longer chromosome would have more indices, which would mean that corresponding slices could not always be formed between the chromosomes. Restricting the crossover indices to those in the shorter chromosome is an unattractive solution, whereas, allowing the slice indices complete freedom would cause violations of the gene structure. In one embodiment, the principles of the present invention utilize a multi-level index approach to resolve this problem.

For chromosomes with a fixed number of genes, a multi-level index is used to equalize the likelihood of a crossover slice index occurring inside a particular gene when the genes were represented by different numbers of bits. Consider the 4-gene chromosome illustrated in FIG. 5. FIG. 5 is a diagram depicting the multi-level index crossover in a binary genetic algorithm in accordance with an embodiment of the present invention.

Referring to FIG. 5, genes 0, 1, 2, 3 and 4 are represented by 3, 11, 5 and 7 bits, respectively. The first crossover operation occurs at gene 0, bit 2. A second crossover operation is then applied at gene 2, bit 3. As a result, the bits between each crossover point are exchanged.

As previously discussed gene 1 has 11 bits; whereas, gene 0 only has 3 bits. The indices of a crossover that treated each bit equally would occur inside gene 0 only 7.7% of the time versus 34.6% of the time for gene 1. Instead, the gene could be stochastically selected using an outer index based on the number of genes, and the inner index could then be selected based on the number of bits in the selected gene. The weighting function used to select each gene index could also weight each gene based on the number of bits.

After selecting the gene index, the inner index is selected from a uniform distribution. If the final gene is selected, the maximum inner index allowed to be selected is increased by one to represent a slice ending at the end of the chromosome. When combined with a parametric index and a repeating gene structure based on a modular compound "supergene" structure, the multi-level index approach to crossover can also be used to resolve the gene-slicing problem when performing crossover on chromosomes of differing lengths. A supergene is defined as a set of sub-genes conforming to a uniform structure. Crossover could occur between chromosomes containing different numbers of supergenes when the inner crossover indices were kept the same as shown in FIG. 6.

FIG. 6 is a diagram illustrating a multi-level crossover for chromosome with repeating supergenes in accordance with an embodiment of the present invention.

In one embodiment, every actuation waveform requires at least one ascending and one descending voltage ramp to dispense a drop. For this reason, a waveform defined by a variable number of parameters is required to have a minimum number of parameters corresponding to a trapezoidal pair of primary voltage ramps.

In one embodiment, the superposition of trapezoidal pulses is handled sequentially. Each ramp is ordered in time, and the waveform time-series is modified by each ramp by incrementing the voltage by the slew rate at each timestep from the ramp start time until the saturation voltage is reached. In one embodiment, the final voltage ramp is slewed to zero. When converting the waveform for the controller software, extra control points are introduced, if necessary, to define regions where the intersection of two or more ramps resulted in a superposition of slew rates.

Figure 7A:
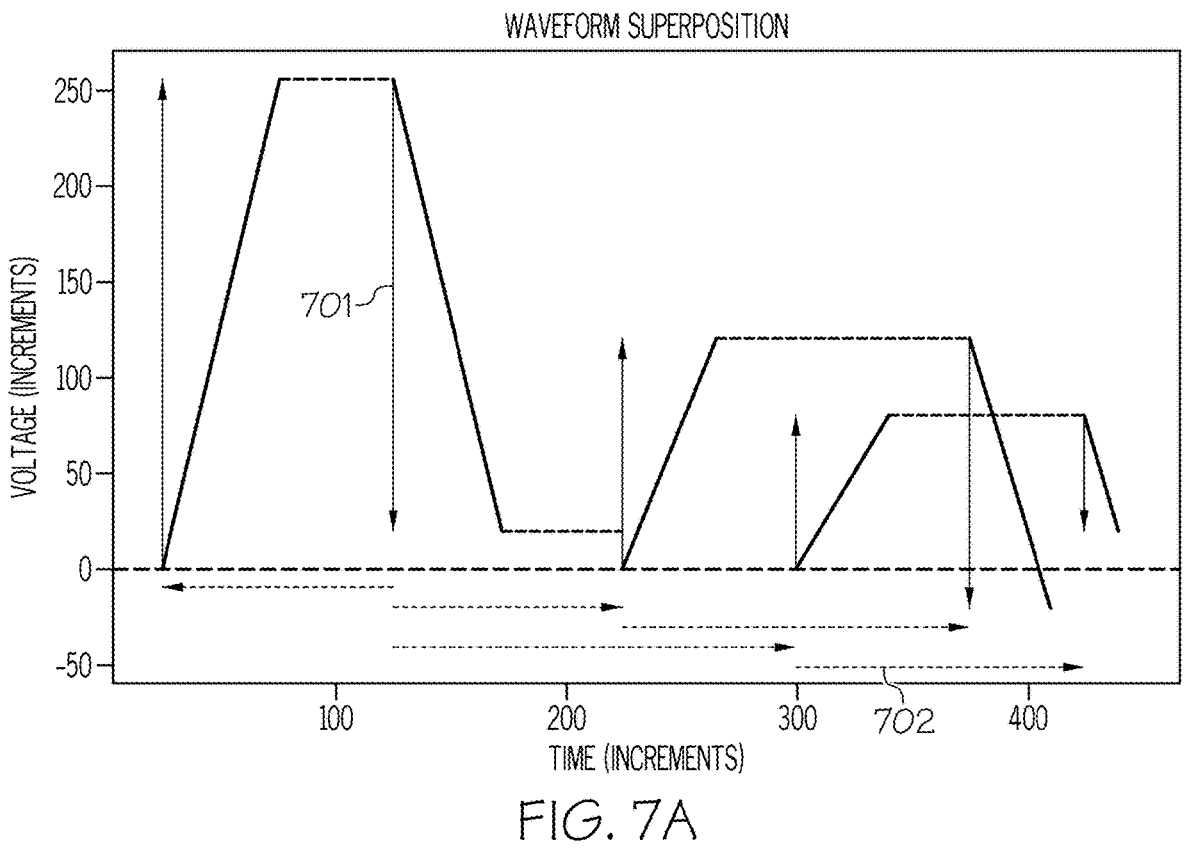
FIG. 7A shows the free-topology waveform component parameterization in accordance with an embodiment of the present invention.

The parameterization and superposition of waveform components for the free waveform topology is demonstrated in FIG. 7A. FIG. 7A shows the free-topology waveform component parameterization in accordance with an embodiment of the present invention. Arrows 701 indicate the change in voltage for each ramp, and arrows 702 indicate the start and end of each ramp. A slew rate is also defined for each ramp.

Figure 7B:
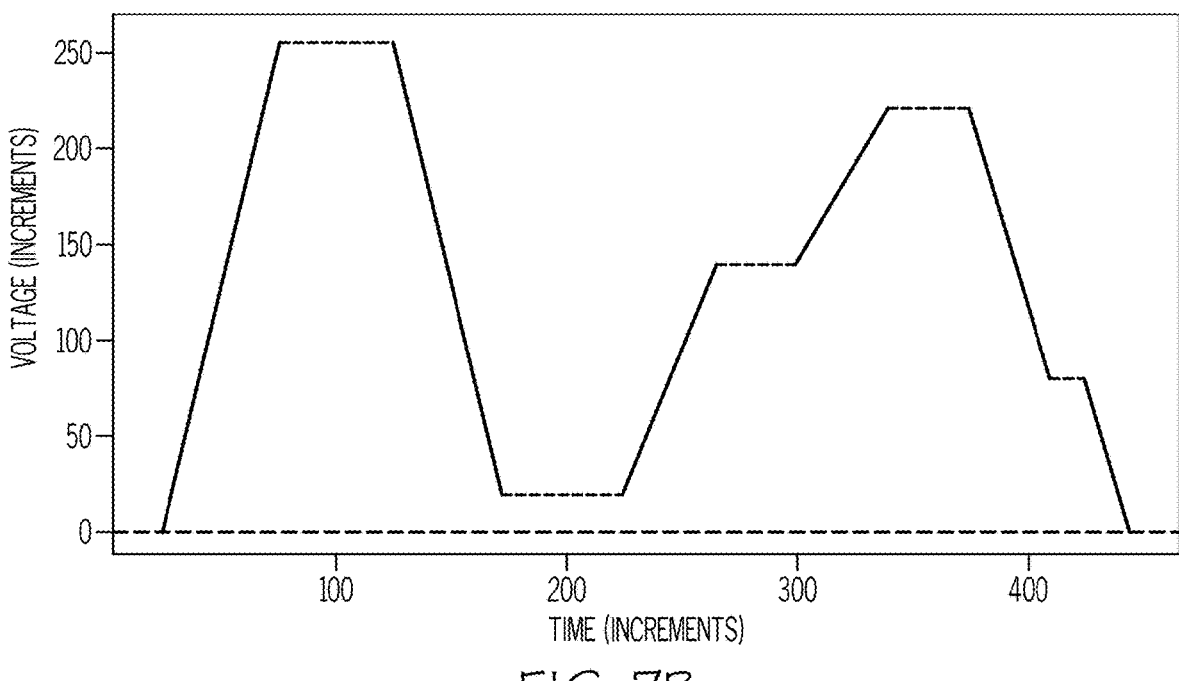
FIG. 7B shows the resulting superposition of the components shown in FIG. 7A in accordance with an embodiment of the present invention.

FIG. 7B shows the resulting superposition of the components shown in FIG. 7A in accordance with an embodiment of the present invention. When building the waveform shown in FIG. 7B, each ramp from FIG. 7A takes effect from left to right, with the final falling ramp forced to return to 0V.

Referring to FIGS. 7A-7B, the main expansion and compression pulses occur starting at 0V, rising to the peak voltage V0, and falling by V1. These were followed by two "free" trapezoidal pulses, which superposed sequentially as described above and shown in FIG. 7B.

Fitness function in an evolutionary algorithm combines a set of performance metrics estimated using one or more functions of sensed output variables into one or more figures of merit. The fitness function defines optimality in a multi-objective context via scalarization, a process which balances convergence with diversity for each metric. For most selection methods, including fitness proportional selection, the fitness function should return a greater value corresponding to better performance. Most performance metrics relevant to jetting performance can be expressed by L-norm (e.g., L-2, L-infinity norm) or Mean Square Error-like functions (e.g., a regression loss function); however, a reciprocal sum or negative sum of square errors is not appropriate for fitness proportional selection. In one embodiment, a weighted product (WPR) scalarization approach is used. In one embodiment, it is combined with remapping functions to scale and bound the sensitivity of the fitness function to each performance metric. The advantage of the WPR approach is that other forms of merit functions can also be included, such as the sigmoid function, or a super-Gaussian function. The super-Gaussian is defined as:

$$f(x) = e^{-(\alpha(x-e)^2)^\rho} \tag{1}$$

The parameter $\rho$ in the super-Gaussian added an additional degree of freedom to the Gaussian function so that its tail heaviness can be modified. Heavier tailed merit functions treat a wider range of lesser performing solutions with lower sensitivity, only increasing sensitivity in the critical region between the inflection points, as shown in FIGS. 8A-8B.

Figure 8A:
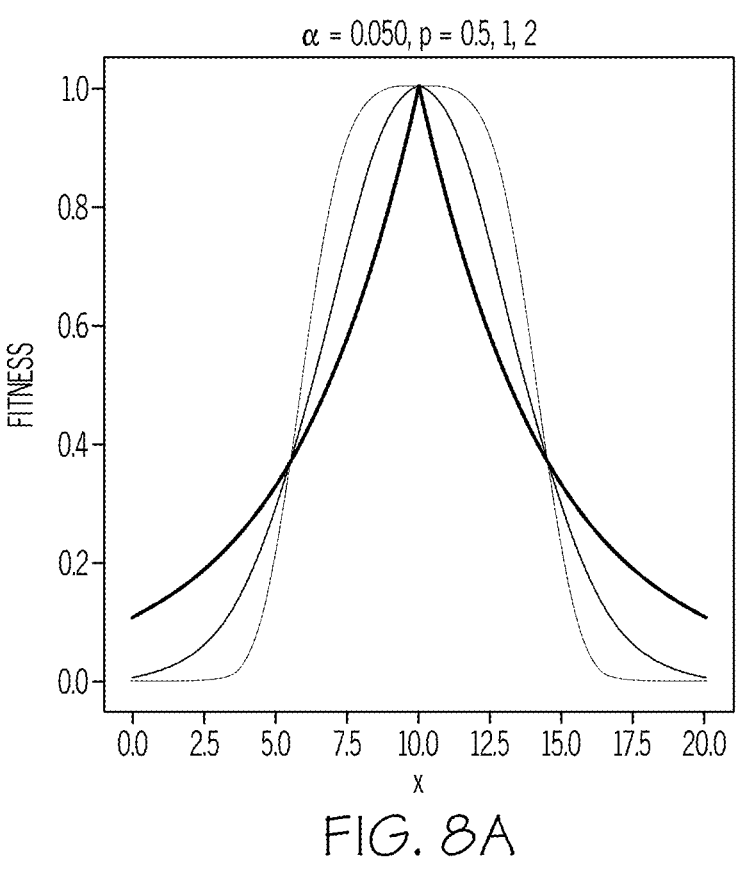
FIGS. 8A-8B illustrate super-Gaussian curves that show the effect of varying $\alpha$ and $\rho$, which control the width of the curve and the tail heaviness, respectively, in accordance with an embodiment of the present invention.
Figure 8B:
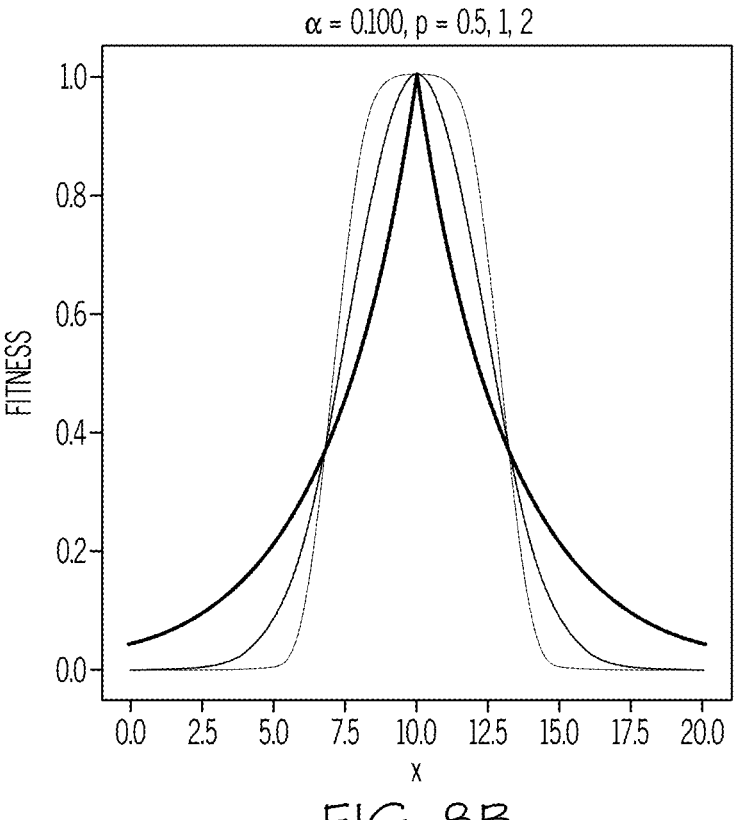

FIGS. 8A-8B illustrate super-Gaussian curves that show the effect of varying $\alpha$ and $\rho$, which control the width of the curve and the tail heaviness, respectively, in accordance with an embodiment of the present invention.

The weights in a sigmoid function can be determined by selecting a baseline performance level about which sensitivity is maximized, and a performance goal, after which sensitivity decreases to increase the overall fitness function sensitivity relative to the remaining metrics.

In one embodiment, the metrics incorporated into the fitness function are the drop placement accuracy, mean drop volume, drop volume uniformity, presence of transient faults, presence of debris, and the numbers of satellite drops and missing drops. In one embodiment, drop placement is calculated based on each reference grid location. The drop placement error for each reference grid location can be defined as the volume-weighted sum of errors for all drops for which that reference location was the nearest. In one embodiment, missing drop locations are excluded from this mean squared error (MSE), so the mean is based on the difference between the number of reference positions and the number of missing drops. The MSE is remapped to a Gaussian to keep it bounded between 0 and 1. The mean of the largest drop size and the mean of the sums of drop sizes at each reference point are each used to define merit functions reflecting the mean drop size. In one embodiment, the drop size uniformity can be defined in a fitness function based on the variation in the sizes of the largest drops and the variation in the sums of the sizes of all drops at each reference location. Satellite drops are defined as drops that are not closer to any reference location than any other drop. The penalty for the presence of satellite drops is also incorporated into the fitness function. Although the effect of satellites is also implicit in several of the above measures of performance, their presence in large numbers is considered a major fault.

Missing drops are defined by a reference location to which no drop was closest. The penalty for missing drops can be made similar to or different from the penalty for satellite drops since transient faults may occur where the first few dispenses are missed, whereas, the rest of the drops dispense uniformly.

Figure 9A:
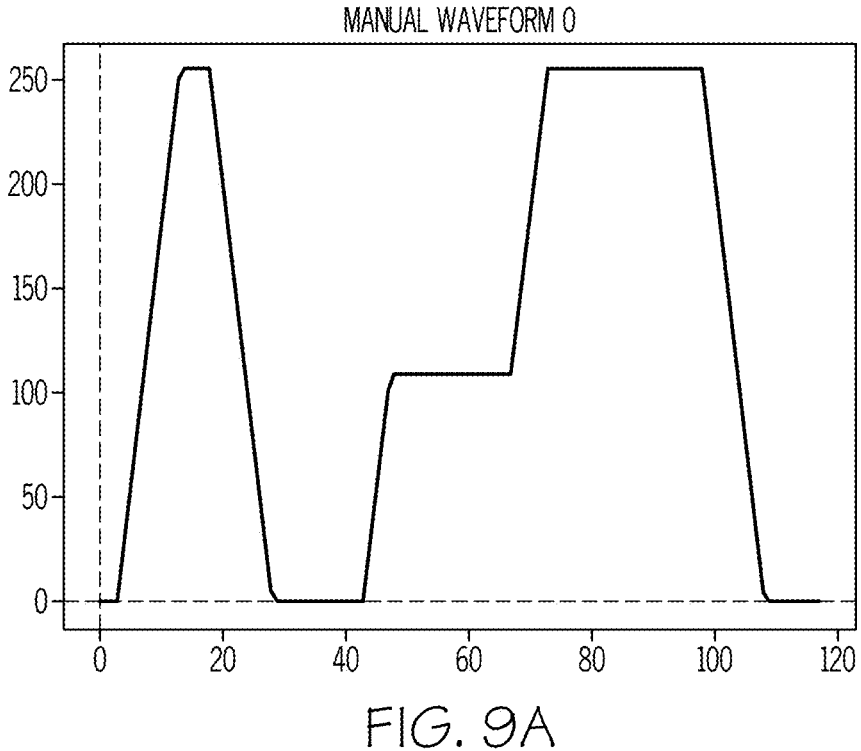
FIG. 9A illustrates a waveform obtained by manual tuning in accordance with an embodiment of the present invention.
Figure 9B:
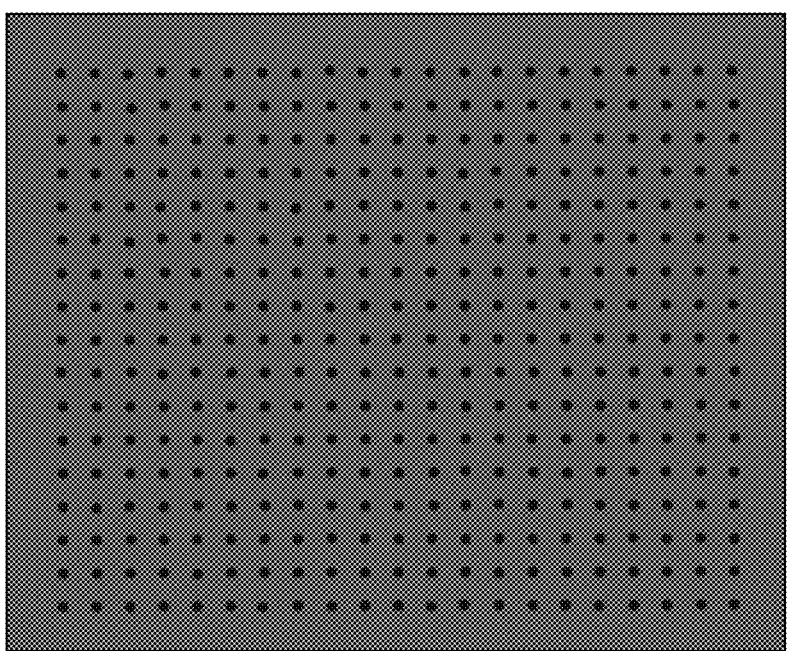
FIG. 9B illustrates an image of the dispensed drops by the manual waveform of FIG. 9A on a silicon wafer coated with perfluorooctyltrichlorosilane (FOTS) in accordance with an embodiment of the present invention.

FIG. 9A illustrates a waveform obtained by manual tuning in accordance with an embodiment of the present invention. FIG. 9B illustrates an image of the dispensed drops by the manual waveform of FIG. 9A on a silicon wafer coated with perfluorooctyltrichlorosilane (FOTS) in accordance with an embodiment of the present invention. This waveform is defined by 13 parameters.

Figure 10A:
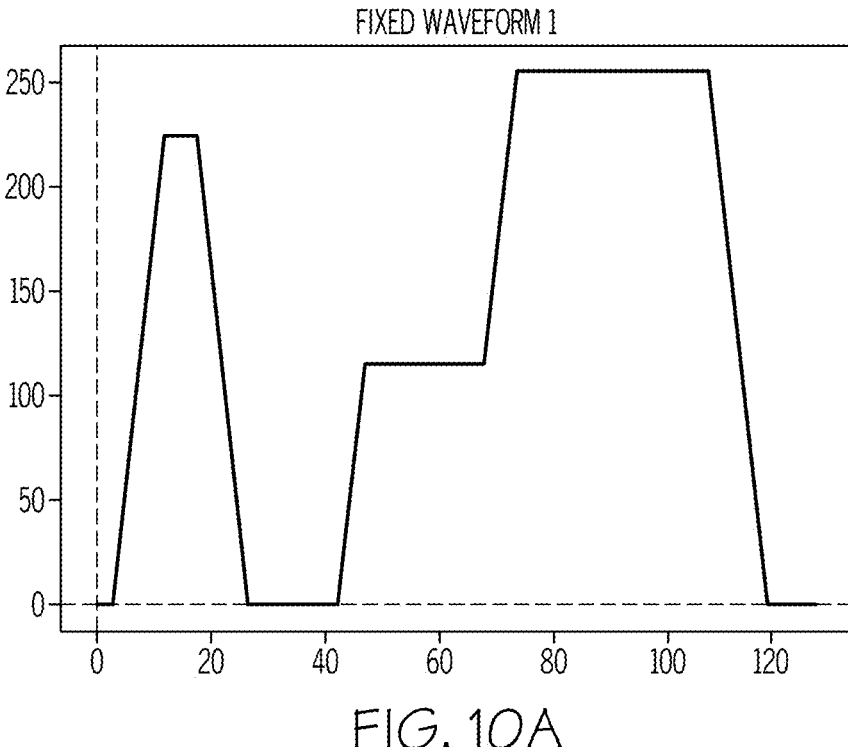
FIG. 10A illustrates a waveform obtained by a fixed topology optimization in accordance with an embodiment of the present invention.
Figure 10B:
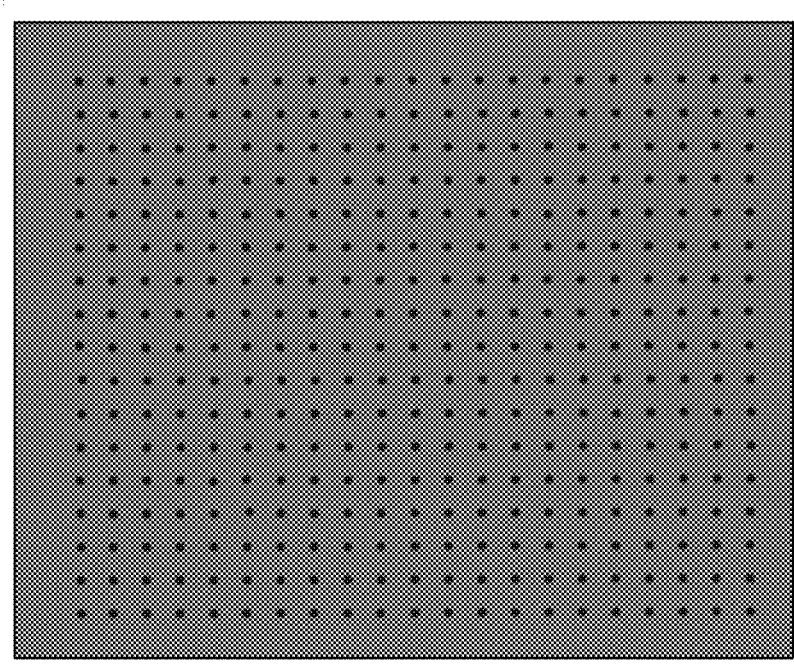
FIG. 10B illustrates an image of the dispensed drops by the fixed topology waveform of FIG. 10A on a silicon wafer coated with FOTS in accordance with an embodiment of the present invention.

FIG. 10A illustrates a waveform obtained by a fixed topology optimization in accordance with an embodiment of the present invention. FIG. 10B illustrates an image of the dispensed drops by the fixed topology waveform of FIG. 10A on a silicon wafer coated with FOTS in accordance with an embodiment of the present invention. This waveform is defined by a fixed topology of 13 parameters.

Figure 11A:
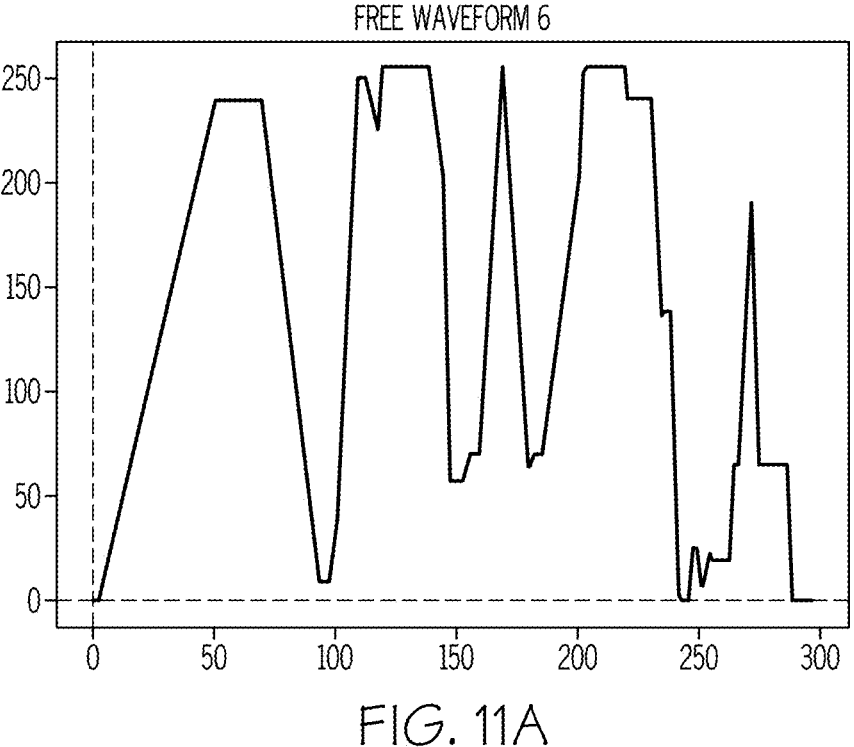
FIG. 11A illustrates a waveform time series obtained by automated tuning using a free topology optimization in accordance with an embodiment of the present invention.
Figure 11B:
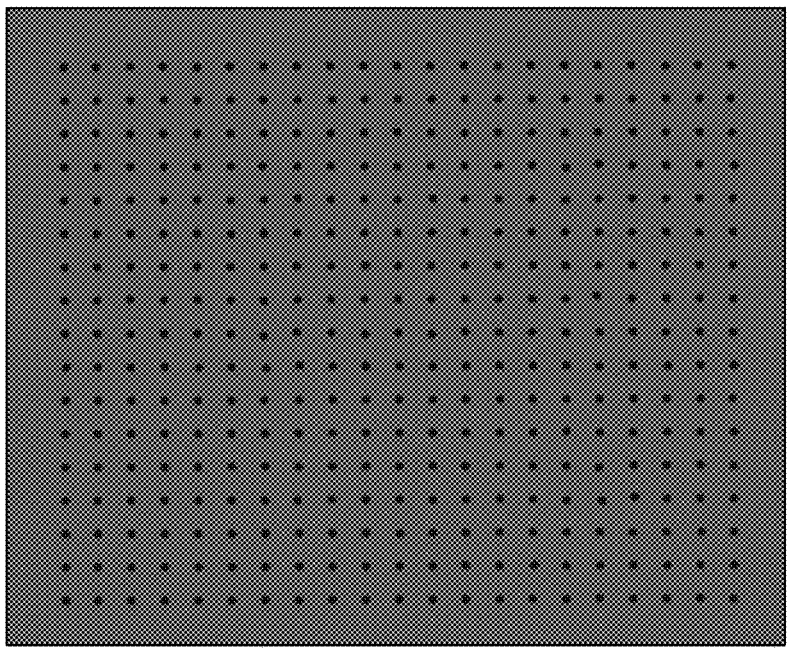
FIG. 11B illustrates an image of the dispensed drops by the free topology waveform of FIG. 11A on a silicon wafer coated with FOTS in accordance with an embodiment of the present invention.

FIG. 11A illustrates a waveform time series of a waveform obtained by automated tuning using a free topology optimization in accordance with an embodiment of the present invention. FIG. 11B illustrates an image of the dispensed drops by the free topology waveform of FIG. 11A on a silicon wafer coated with FOTS in accordance with an embodiment of the present invention. This waveform had an initial topology of less than 20 parameters but was finally optimized with a topology of 124 parameters.

The free-topology GA was able to find high performing waveforms exceeding 100 parameters, producing waveforms that resulted in the smallest observed drop sizes while also maintaining jetting reliability and 3-sigma placement accuracy in both x and y directions within 10 μm. In particular, the smallest drops produced by a free-topology waveform measured 303.8 μm$^2$ in area, which corresponded to an estimated volume of 336 fL. This represented a 49.4% reduction in sessile drop area and a 64.1% reduction in drop volume as compared to the smallest drops produced by manual tuning in addition to a 22.8% reduction in drop volume as compared to the smallest drops produced by a fixed-topology waveform.

In one embodiment, genetic algorithms are chosen as a stochastic method for optimizing inkjet actuation waveforms, which are typically defined by a set of parameters that are fed to an inkjet controller, which generates the analog waveform when triggered to actuate the inkjet. Typically, the waveform parameter domains are discrete and bounded.

In inkjet systems, there are no internal sensors that can be used to determine drop speed, drop size (volume), or the number of drops ejected during each actuation. Furthermore, an accurate model of inkjet systems may be difficult or impossible to obtain. Hence, in one embodiment, actuation waveforms are implemented on actual inkjet systems using real-time computer vision as feedback, which synergize with the iterative experimentation required for utilizing genetic algorithms.

In one embodiment, for a multi-nozzle inkjet head testbed, an on-substrate imaging testbed is constructed to test waveforms using two types of sophisticated genetic algorithms—a "fixed-topology" algorithm and a more advanced "free-topology" algorithm. On-substrate imaging can capture the transient behavior of an inkjet, in contrast with in-flight imaging, which can only capture the steady-state behavior of an inkjet as it prints a continuous stream of drops. Furthermore, drops from multiple nozzles can be observed in a single on-substrate image, and the aggregated drop placement accuracy can be measured directly. The placement accuracy, drop size (volume), and robustness of a waveform to transient irregularities and variation of conditions at each nozzle were evaluated by computer vision.

In one embodiment, the free topology scheme is modified to allow the addition or removal of a supergene (set of 6 waveform parameters) depending on the number of supergenes present in a waveform. More than one supergene might be added at a time, and they might be removed in blocks based on a range of start times. In another embodiment, the sensitivity of the fuzzy likelihood function that stochastically selects a supergene in one waveform that is "nearby" in time to a supergene in another waveform is experimented with. In one embodiment, the fitness coefficients (for either the free topology scheme or the fixed topology scheme) for each generation are adapted based on the distribution of performance in the current population.

In one embodiment, high performing waveforms are found at a variety of complexity levels for a given jet and material combination, but having higher number of parameters are beneficial from a reliability and robustness standpoint. The frequency response of piezo-jets includes resonant peaks at frequencies approaching 0.1-1 MHz; therefore, subtle impulses and overshoots of large parameter waveforms may have an impact on the overall performance of these multi-jet piezo printheads.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for controlling a system, the method comprising:

defining a control variable vector by a topology and a set of scalar values associated with said topology, wherein said control variable vector corresponds to a set of one or more control variables, wherein said control variables are inputs to said system that are optimized and allow said system to be controlled, wherein said topology corresponds to a number of control variables present in said control variable vector;

determining an initial value for said control variable vector that activates said system to create an initial set of sensed output variables, wherein said initial value for said control variable vector corresponds to a set of chromosomes;

calculating a fitness function comprising said initial set of sensed output variables, wherein said fitness function defines a desired behavior of said system;

creating an optimized control variable vector using said fitness function by updating and adjusting said topology of said control variable vector based on minimizing a difference between a value of said fitness function of said optimized control variable vector and a value of a target fitness function, wherein a multi-level index is used to update and adjust said topology of said control variable vector to address a problem when different genes of said set of chromosomes are represented by a different number of bits by creating said optimized control variable vector that ensures a probability of a crossover happening inside a gene is the same for all genes regardless of their size, wherein an outer index of said multi-level index is used to select a gene to be used for said crossover, wherein an inner index of said multi-level index is used to select a specific bit within said selected gene; and controlling said system using said created optimized control variable vector.

2. The method as recited in claim 1 further comprising:

receiving a set of fixed system parameters.

3. The method as recited in claim 1, wherein said optimized control variable vector is created using free topology optimization.

4. The method as recited in claim 1, wherein said optimized control variable vector is created in response to an algorithm being executed until said fitness function reaches a maximum value.

5. The method as recited in claim 4, wherein said optimized control variable vector comprises an optimum topology and a set of optimal parameters for said optimum topology.

6. The method as recited in claim 1, wherein said system is an inkjet system, wherein said control variable vector defines an inkjet waveform, wherein said initial set of sensed output variables comprise one or more of the following: a volume, a drop placement accuracy, a velocity, satellites of inkjetted drops, missing drops, and transient faults in inkjetted drops.

7. A computer program product for controlling a system, the computer program product comprising one or more computer readable storage mediums having program code embodied therewith, the program code comprising programming instructions for;

defining a control variable vector by a topology and a set of scalar values associated with said topology, wherein said control variable vector corresponds to a set of one or more control variables, wherein said control variables are inputs to said system that are optimized and allow said system to be controlled, wherein said topology corresponds to a number of control variables present in said control variable vector;

determining an initial value for said control variable vector that activates said system to create an initial set of sensed output variables, wherein said initial value for said control variable vector corresponds to a set of chromosomes;

calculating a fitness function comprising said initial set of sensed output variables, wherein said fitness function defines a desired behavior of said system;

creating an optimized control variable vector using said fitness function by updating and adjusting said topology of said control variable vector based on minimizing a difference between a value of said fitness function of said optimized control variable vector and a value of a target fitness function, wherein a multi-level index is used to update and adjust said topology of said control variable vector to address a problem when different genes of said set of chromosomes are represented by a different number of bits by creating said optimized control variable vector that ensures a probability of a crossover happening inside a gene is the same for all genes regardless of their size, wherein an outer index of said multi-level index is used to select a gene to be used for said crossover, wherein an inner index of said multi-level index is used to select a specific bit within said selected gene; and controlling said system using said created optimized control variable vector.

8. A controller, comprising:

a memory for storing a computer program for controlling a system; and a processor connected to said memory, wherein said processor is configured to execute program instructions of the computer program comprising:

defining a control variable vector by a topology and a set of scalar values associated with said topology, wherein said control variable vector corresponds to a set of one or more control variables, wherein said control variables are inputs to said system that are optimized and allow said system to be controlled, wherein said topology corresponds to a number of control variables present in said control variable vector;

determining an initial value for said control variable vector that activates said system to create an initial set of sensed output variables, wherein said initial value for said control variable vector corresponds to a set of chromosomes;

calculating a fitness function comprising said initial set of sensed output variables, wherein said fitness function defines a desired behavior of said system;

creating an optimized control variable vector using said fitness function by updating and adjusting said topology of said control variable vector based on minimizing a difference between a value of said fitness function of said optimized control variable vector and a value of a target fitness function, wherein a multi-level index is used to update and adjust said topology of said control variable vector to address a problem when different genes of said set of chromosomes are represented by a different number of bits by creating said optimized control variable vector that ensures a probability of a crossover happening inside a gene is the same for all genes regardless of their size, wherein an outer index of said multi-level index is used to select a gene to be used for said crossover, wherein an inner index of said multi-level index is used to select a specific bit within said selected gene; and controlling said system using said created optimized control variable vector.

9. A computer-implemented method for performing inkjet printing, the method comprising:

determining a control variable vector of actuation parameters associated with an inkjet waveform, wherein said inkjet waveform is represented as a variable-length chromosome in a genetic algorithm;

actuating a printhead to eject a grid of droplets from an inkjet onto a substrate based on said inkjet waveform;

acquiring an image of said grid of droplets on said substrate;

processing said acquired image to calculate a fitness function of said inkjet waveform comprising a function of sensed output variables associated with printing characteristics, wherein said fitness function defines a desired behavior of an inkjet system; and adjusting said control variable vector by updating its topology based on said fitness function of said inkjet waveform to obtain an optimized control variable vector associated with an optimized inkjet waveform based on minimizing a difference between a value of said fitness function of said inkjet waveform and a value of a target fitness function, wherein said topology corresponds to a number of control variables present in said control variable vector, wherein a multi-level index is used to adjust said control variable vector to address a problem when different genes of a set of chromosomes are represented by a different number of bits by obtaining said optimized control variable vector that ensures a probability of a crossover happening inside a gene is the same for all genes regardless of their size, wherein an outer index of said multi-level index is used to select a gene to be used for said crossover, wherein an inner index of said multi-level index is used to select a specific bit within said selected gene.

10. The method as recited in claim 9, wherein said optimized control variable vector comprises an optimum topology and a set of optimal parameters for said optimum topology.

11. The method as recited in claim 9, wherein said printing characteristics comprise one or more of the following: drop volume uniformity, mean drop volume, drop placement accuracy, presence of transient faults, number of satellite drops, number of missing drops, and presence of debris.

12. The method as recited in claim 9, wherein said adjustment of said control variable vector comprises calculating an error between said fitness function of said inkjet waveform and said target fitness function.

13. The method as recited in claim 12 further comprising: optimizing said error using a free topology evolutionary algorithm.

14. The method as recited in claim 9, wherein said waveform has more than 20 parameters.

15. The method as recited in claim 9, wherein said waveform has more than 3 parameters.

16. The method as recited in claim 9 further comprising: controlling a plurality of nozzles to eject a plurality of droplets, wherein each of said plurality of nozzles is independently controlled.

17. The method as recited in claim 9, wherein said printhead is configured to dispense a plurality of fluids, wherein one of said plurality of fluids has a different rheological property than another one of said plurality of fluids.

18. A computer program product for performing inkjet printing, the computer program product comprising one or more computer readable storage mediums having program code embodied therewith, the program code comprising programming instructions for:

determining a control variable vector of actuation parameters associated with an inkjet waveform, wherein said inkjet waveform is represented as a variable-length chromosome in a genetic algorithm;

actuating a printhead to eject a grid of droplets from an inkjet onto a substrate based on said inkjet waveform;

acquiring an image of said grid of droplets on said substrate;

processing said acquired image to calculate a fitness function of said inkjet waveform comprising a function of sensed output variables associated with printing characteristics, wherein said fitness function defines a desired behavior of an inkjet system; and adjusting said control variable vector by updating its topology based on said fitness function of said inkjet waveform to obtain an optimized control variable vector associated with an optimized inkjet waveform based on minimizing a difference between a value of said fitness function of said inkjet waveform and a value of a target fitness function, wherein said topology corresponds to a number of control variables present in said control variable vector, wherein a multi-level index is used to adjust said control variable vector to address a problem when different genes of a set of chromosomes are represented by a different number of bits by obtaining said optimized control variable vector that ensures a probability of a crossover happening inside a gene is the same for all genes regardless of their size, wherein an outer index of said multi-level index is used to select a gene to be used for said crossover, wherein an inner index of said multi-level index is used to select a specific bit within said selected gene.

19. A system, comprising:

a memory for storing a computer program for performing inkjet printing; and a processor connected to said memory, wherein said processor is configured to execute program instructions of the computer program comprising:

determining a control variable vector of actuation parameters associated with an inkjet waveform, wherein said inkjet waveform is represented as a variable-length chromosome in a genetic algorithm;

actuating a printhead to eject a grid of droplets from an inkjet onto a substrate based on said inkjet waveform;

acquiring an image of said grid of droplets on said substrate;

processing said acquired image to calculate a fitness function of said inkjet waveform comprising a function of sensed output variables associated with printing characteristics, wherein said fitness function defines a desired behavior of an inkjet system; and adjusting said control variable vector by updating its topology based on said fitness function of said inkjet waveform to obtain an optimized control variable vector associated with an optimized inkjet waveform based on minimizing a difference between a value of said fitness function of said inkjet waveform and a value of a target fitness function, wherein said topology corresponds to a number of control variables present in said control variable vector, wherein a multi-level index is used to adjust said control variable vector to address a problem when different genes of a set of chromosomes are represented by a different number of bits by obtaining said optimized control variable vector that ensures a probability of a crossover happening inside a gene is the same for all genes regardless of their size, wherein an outer index of said multi-level index is used to select a gene to be used for said crossover, wherein an inner index of said multi-level index is used to select a specific bit within said selected gene.

* * * * *